(12) United States Patent
Huelsebusch et al.

(10) Patent No.: US 9,229,457 B2
(45) Date of Patent: Jan. 5, 2016

(54) DETERMINING A DRIVING STRATEGY FOR A VEHICLE

(75) Inventors: Dirk Huelsebusch, Stuttgart (DE); Maike Salfeld, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/351,822

(22) PCT Filed: Aug. 28, 2012

(86) PCT No.: PCT/EP2012/066629
§ 371 (c)(1),
(2), (4) Date: Aug. 4, 2014

(87) PCT Pub. No.: WO2013/056881
PCT Pub. Date: Apr. 25, 2013

(65) Prior Publication Data
US 2014/0371974 A1 Dec. 18, 2014

(30) Foreign Application Priority Data
Oct. 17, 2011 (DE) .......................... 10 2011 084 606

(51) Int. Cl.
*B60L 3/00* (2006.01)
*G05D 13/00* (2006.01)
*B60K 31/00* (2006.01)

(52) U.S. Cl.
CPC ............ *G05D 13/00* (2013.01); *B60K 31/0008* (2013.01); *B60W 2510/0623* (2013.01); *B60W 2510/244* (2013.01); *B60W 2520/10* (2013.01); *B60W 2550/302* (2013.01); *B60W 2550/308* (2013.01); *B60W 2710/0655* (2013.01); *B60W 2720/106* (2013.01); *Y02T 10/52* (2013.01)

(58) Field of Classification Search
None
See application file for complete search history.

(56) References Cited

U.S. PATENT DOCUMENTS

| 6,076,622 | A | 6/2000 | Chakraborty | |
|---|---|---|---|---|
| 6,339,740 | B1 * | 1/2002 | Seto et al. | 701/96 |
| 6,470,256 | B1 | 10/2002 | Cikalo | |
| 2006/0015240 | A1 * | 1/2006 | Shima | 701/93 |
| 2006/0015241 | A1 * | 1/2006 | Shima | 701/96 |
| 2009/0135049 | A1 * | 5/2009 | Kikuchi | 342/70 |
| 2009/0259354 | A1 | 10/2009 | Krupadanam et al. | |
| 2013/0041567 | A1 * | 2/2013 | Yamashiro | 701/96 |

FOREIGN PATENT DOCUMENTS

| DE | 42 00 694 | 7/1993 |
|---|---|---|
| DE | 103 38 647 | 3/2005 |
| DE | 10 2004 017 115 | 10/2005 |
| DE | 10 2010 003428 | 10/2011 |
| EP | 1 344 672 | 9/2003 |
| EP | 1 777 135 | 4/2007 |

(Continued)

OTHER PUBLICATIONS

International Search Report for PCT/EP2012/066629, issued on Jan. 21, 2013.

*Primary Examiner* — Adam Alharbi
(74) *Attorney, Agent, or Firm* — Kenyon & Kenyon LLP

(57) ABSTRACT

A method and driver assistance system for determining a longitudinal dynamics driving strategy for a vehicle based on a driving condition specification, includes a processor selecting a driving strategy in consideration of the power consumption and in consideration of a detection, by a rear traffic detection unit, of a following vehicle.

11 Claims, 4 Drawing Sheets

(56) References Cited

FOREIGN PATENT DOCUMENTS

| | | |
|---|---|---|
| EP | 1 923 291 | 5/2008 |
| JP | 2010167994 A | 8/2010 |
| JP | 2010264841 A | 11/2010 |
| WO | WO 2009/126554 | 10/2009 |

* cited by examiner

DETERMINING A DRIVING STRATEGY FOR A VEHICLE

FIELD OF THE INVENTION

The present invention relates to a method for determining a longitudinal dynamics driving strategy for a vehicle based on a driving condition specification and a driver assistance system for a vehicle including a control unit for determining a longitudinal dynamics driving strategy for the vehicle based on a driving condition specification. In particular, the present invention relates to such a method in which the vehicle is a motor vehicle, and such a driver assistance system for a motor vehicle.

BACKGROUND

EP 1 923 291 A2 describes a method for utilizing the momentum of a motor vehicle, in which position data and speed data of the motor vehicle are detected and are processed together with data of a digitized map of a road network, a starting point being ascertained, at which coasting of the motor vehicle is initiated. For example, by a corresponding beginning of a coasting phase of the motor vehicle, the coasting vehicle may arrive at the correct speed at the beginning of a route section having a speed limit. The momentum of the vehicle may therefore be utilized to save energy and costs and to protect the environment.

EP 1 777 135 A1 describes a method for adapting driving parameters of a vehicle, in which position data of the vehicle at a first point in time are ascertained, future position data of the vehicle in a future period of time are ascertained, and at least one driving parameter is adapted based on the position data ascertained for the future period of time. The driving parameter may thus be adapted in an energy-saving way. Thus, for example, a strong acceleration of the vehicle may be omitted if the vehicle would have to be decelerated again soon because of a curve.

DE 10 2004 017 115 A1 describes a method for speed control for a vehicle in an automatic cruise control or an automatic interval control operation, in which at a predefined setpoint speed in an energy-saving operating mode, an acceleration phase and a coasting phase of the vehicle take place alternately. In the acceleration phase, the vehicle is accelerated to an upper threshold for the speed, and the subsequent coasting phase lasts until reaching a lower threshold for the speed. Upon reaching the lower threshold, the vehicle is accelerated in the consumption-optimized range back to the upper threshold for the speed.

SUMMARY

The manner of driving plays a large role in the amount of energy consumption and emissions of a motor vehicle. An efficient manner of driving, for reduction thereof, is primarily characterized by a moderate curve of the driving speed and the acceleration. Driver assistance systems have been developed which assist the driver with respect to an energy-saving manner of driving, in particular with respect to the utilization of the kinetic and potential energy of the vehicle.

In the case of known methods for determining a driving strategy for a motor vehicle based on a driving condition specification, for example, a maximum speed associated with a route section of the road network, future position data of the vehicle for a future period of time, or a setpoint speed to be maintained, economic aspects may be taken into consideration in the determination of a driving strategy for the motor vehicle.

The conception of energy-saving driving strategies is also subject to limits, however, in that in the event of strong deviation of the driving strategy from a driving strategy perceived as conventional, a driver of a following vehicle could become irritated. For example, if the speed of the vehicle is perceived to be very slow in a specific traffic situation, a driver of a following vehicle could be induced to follow excessively closely or to carry out a risky passing maneuver under certain circumstances.

An object of the present invention is to provide a method for determining a longitudinal dynamics driving strategy for a vehicle, the acceptance of which by the user and other road users is improved.

This object is achieved according to the present invention by a method for determining a longitudinal dynamics driving strategy for a vehicle based on a driving condition specification, where a selection of the driving strategy is carried out in consideration of the power consumption and as a function of a detection of a following vehicle by a rear traffic detection unit. The consideration of the power consumption preferably is or includes, in the case of a vehicle which has a drive engine in the form of an internal combustion engine, a consideration of the fuel consumption of the particular driving strategy. In an example embodiment, the method is performed for controlling the speed of the vehicle.

The driving condition specification can include in particular a target speed. Examples of driving condition specifications are a target setpoint speed to be maintained by the vehicle, a target setpoint speed to be reached by accelerations from a standstill or from an instantaneous speed, a target speed associated with a future vehicle position, for example, a beginning or an end of a speed-limit zone, or a target speed of zero which is associated with a future vehicle position. The target speed of zero may be associated with, for example, a position in front of a light-signal system, for example, a traffic light, which the vehicle is approaching.

The longitudinal dynamics driving strategy is preferably a driving strategy for reaching the driving condition specification.

In an example embodiment, the longitudinal dynamics driving strategy is formed by a curve of a driving parameter or includes the curve of a driving parameter. The longitudinal dynamics driving strategy preferably includes a driving speed curve or is formed by a driving speed curve. Such a curve of a driving parameter can be determined, for example, as a parameterized curve or in the form of a functional behavior, for example, a regulating behavior. For example, a location-dependent and/or time-dependent driving speed curve can be determined. An example is a point in time for initiating a coasting procedure.

For example, the selection can be carried out in consideration of the power consumption and additionally as a function of a distance and/or a speed of a detected following vehicle. For example, the selection can be carried out in consideration of the power consumption and additionally based on an evaluation of a relevance of a detected following vehicle based on its distance and/or its speed.

According to an example embodiment, aside from consideration of power consumption for the selection of a driving strategy, a following vehicle is also taken into consideration for the selection. Therefore, different power-saving manners of driving may be selected, depending on whether a following vehicle is present. The efficiency of the manner of driving may thus be increased overall, without drivers of following vehicles being annoyed in an undesirable manner. The acceptance and reliability of a method for determining a longitudinal dynamics driving strategy and a corresponding driver assistance system may therefore be increased, and power-saving driving strategies may be implemented.

According to an example embodiment, the method includes, selecting among at least two driving strategies for the same driving condition specification, where one driving strategy, which is preferably selected in the case of a nonexistence of a following vehicle, is more power-saving than another of the driving strategies which would be selected in the event of the presence of a following vehicle and optionally under further conditions, for example.

The selection is preferably carried out among at least two driving strategies, which differ from one another at least with respect to a duration and/or an absolute value of a speed change phase. A speed change phase is to be understood as a phase which is determined with respect to time and/or location, for example, during which the driving speed either increases or decreases.

Power-saving driving strategies based on the same driving condition specification may be distinguished, for example, by one or multiple of the following features. Power-saving strategies can differ with respect to duration of a speed change phase, in particular in the case of the same absolute value of the speed change. For example, the driving strategy can include at least one speed change phase, which extends over a period of time, within which the driving strategy is more power-saving than another driving strategy during the same period of time. For example, the driving strategy can include at least one speed change phase, which extends over a stretch of road, on which the driving strategy is more power-saving than another driving strategy on the same stretch of road.

Furthermore, a power-saving driving strategy may differ with respect to a particular other (less power-saving) driving strategy by way of a different operating mode of the drivetrain, for example, different transmission gears, in particular a higher transmission gear for the more power-saving driving strategy, different allocations of the drive torque between an electric machine and an internal combustion engine in the case of a hybrid vehicle, or different points in time for initiating coasting of the vehicle. In particular, a different duration and/or a different absolute value of a speed change phase of the particular driving strategies can result from these differences.

Preferably, in the case in which the driving condition specification requires a change of the driving speed, the selection is of a strategy from among at least two driving strategies, where one of the strategies, which is selected, for example, at least if a following vehicle is absent, provides a speed change phase extending over a longer duration than another driving strategy.

For example, in the case in which the driving condition specification requires a reduction of the driving speed, the selection is from at least two driving strategies, of which one driving strategy provides a speed change phase which begins earlier and extends over a longer duration than another of the driving strategies. That is, a more slowly progressing speed reduction phase can be selected, where the speed changes more slowly. For example, if a following vehicle is absent, a driving strategy can be selected, which includes a point in time for initiating a coasting procedure of the vehicle, instead of another driving strategy which includes a reduction of the driving speed only at a later point in time.

For example, in the case in which the driving condition specification requires an increase of the driving speed, the selection can be carried out among at least two driving strategies, of which one driving strategy provides a speed increase phase extending over a longer duration than another driving strategy. A more moderate acceleration of the vehicle may thus be achieved.

For example, in the case in which the driving condition specification requires maintenance of a setpoint speed, the selection can be carried out among at least two driving strategies, of which, in the case of one driving strategy, which is selected, for example, at least if a following vehicle is absent, the driving speed varies in a greater range around the setpoint speed than in the case of another driving strategy. A more power-saving manner of driving for maintaining a setpoint speed may be achieved by such a greater tolerance range.

The method can be configured for one or multiple of the described cases, for example, all of them.

For example, in the case of one variant of the method, the driving condition specification is determined based on location information about a circumstance which presumably will require a future deceleration of the vehicle or presumably will permit a future increase of the driving speed. For example, the location information and/or information about the circumstance can be received by a navigation device.

The rear traffic detection unit can be, for example, a rear space sensor unit or can include a rear space sensor unit, in particular a rear space sensor unit for detecting a following vehicle.

The rear space sensor unit can include, for example, one or multiple radar, video, and/or lidar sensors.

In an example embodiment, the rear traffic detection unit includes a communication system for receiving location information about a following vehicle, for example. For example, the communication system can be a vehicle communication system for communication with a communication system outside the vehicle, for example, a communication system also known as a Car2X system, for example a Car2Car communication system.

Furthermore, in an example embodiment, the object is achieved by a driver assistance system for a vehicle, which includes: a control unit for determining a longitudinal dynamics driving strategy for the vehicle based on a driving condition specification; and a rear traffic detection unit for detecting a following vehicle, where the control unit is configured for the purpose of selecting a driving strategy in consideration of the power consumption and as a function of a detection of a following vehicle.

Example embodiments of the present invention are shown in the drawings and are explained in greater detail in the following description.

DETAILED DESCRIPTION

Figure 1:
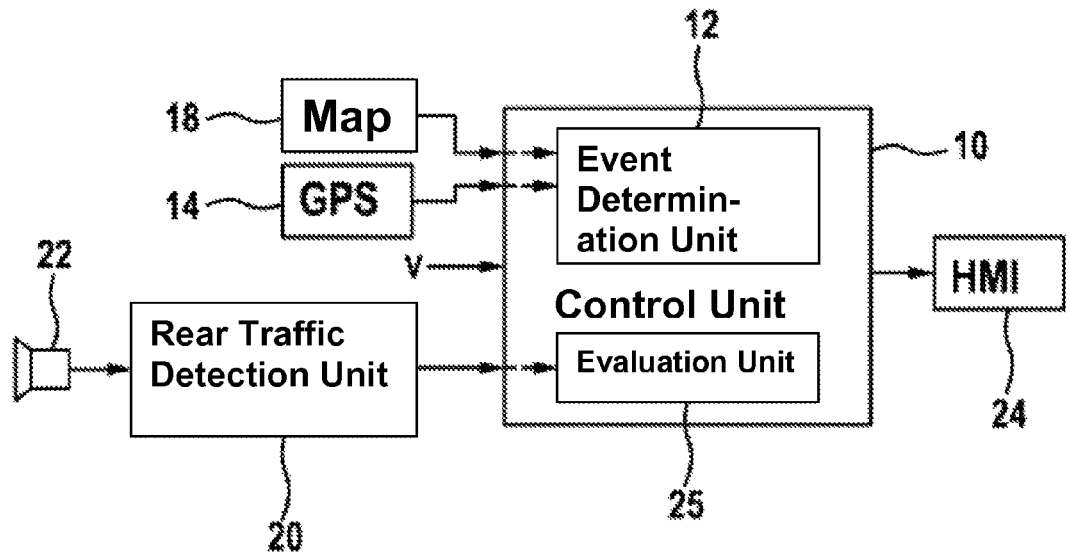
FIG. 1 shows a block diagram of a driver assistance system according to an example embodiment of the present invention.

FIG. 1 shows an example driver assistance system, which includes a control unit 10, which is configured for the purpose of determining a longitudinal dynamics driving strategy for a host vehicle, the determination of the longitudinal dynamics driving strategy including determining a point in time for coasting of the vehicle. The vehicle includes a drive engine in the form of an internal combustion engine, for example.

The driver assistance system includes an event determination unit 12, which is configured to (a) obtain location information with respect to the host vehicle from a present position determination device 14, for example, a GPS system, and (b) determine a driving condition specification, based on the present position of the vehicle and based on location information about a circumstance which will presumably require a future deceleration of the vehicle. Event determination unit 12 can access a digitized map 18 for this purpose. In the example shown, event determination unit 12 is part of control unit 10. Event determination unit 12, present position determination device 14, and/or digitized map 18 can alternatively be part of a navigation device, for example. The driving condition specification includes, for example, a target speed and information about the stretches of road still to be covered, within which the target speed is to be reached. In the case of a target speed equal to zero, the vehicle is to stop at the end of the stretch of road.

Furthermore, the driver assistance system includes a rear traffic detection unit 20, which is configured to detect at least one following vehicle based on sensor information of a sensor 22 situated on the rear of the vehicle. Rear traffic detection unit 20 forms, with sensor 22, a rear space sensor device and can be part of a surroundings sensor system for monitoring the rear space of the host vehicle, as is also known per se for monitoring adjacent lanes in the rear space of the vehicle, for example, for lane change assistants. Rear traffic detection unit 20 is especially configured for the purpose of detecting whether a following vehicle is present on one's own lane within a distance range or within a certain distance.

The distance in question may correspond to the range of the sensor, for example. A following vehicle detected within the distance in question is then treated as relevant, i.e., taken into consideration, for the determination of the driving strategy.

Control unit 10 is configured for the purpose of selecting different driving strategies for a driving condition specification, depending on whether or not rear traffic detection unit 20 detects a following vehicle within the distance in question. If a following vehicle is absent, for example, a starting point, at which coasting of the motor vehicle is to be initiated, is determined based on the driving condition specification and instantaneous driving speed v. For this purpose, the curve of the corresponding coasting speed is calculated for a certain position, the calculated coasting speed at the end of a stretch of road is compared to the target speed which is associated with the end of the stretch of road, and the certain position is established as the starting point for initiating the coasting procedure if the calculated coasting speed at the end of the stretch of road exceeds the target speed. In this case, the vehicle may presumably completely cover the stretch of road in the state of coasting. A method for utilizing the momentum of a motor vehicle is known per se from EP 1 923 291 A2.

In an example embodiment, information about the determined driving strategy may be output to the driver via a driver interface 24 or human machine interface (HMI). For example, reaching the certain point in time for initiating the coasting procedure may be communicated to the driver. The driver is notified via a visual or acoustic signal, for example, that he may release the accelerator pedal or may shift the transmission into neutral, for example, to initiate the coasting procedure.

For example, according to an example embodiment, the system considers speed limits, right-of-way signs, and road intersections as circumstances which may require a reduction of the driving speed. Control unit 10 is configured to determine the instantaneous coasting range, i.e., the range in coasting operation, based on a longitudinal dynamics model and an upcoming incline profile determined with reference to the digitized map 18.

If a following vehicle is present within the predefined distance, control unit 10 determines a later starting point for the coasting procedure. Less energy or fuel might thus be saved than in the case of the first described driving strategy. However, the coasting procedure may not be perceived as excessively slow or lasting an excessively long time.

Figure 2:
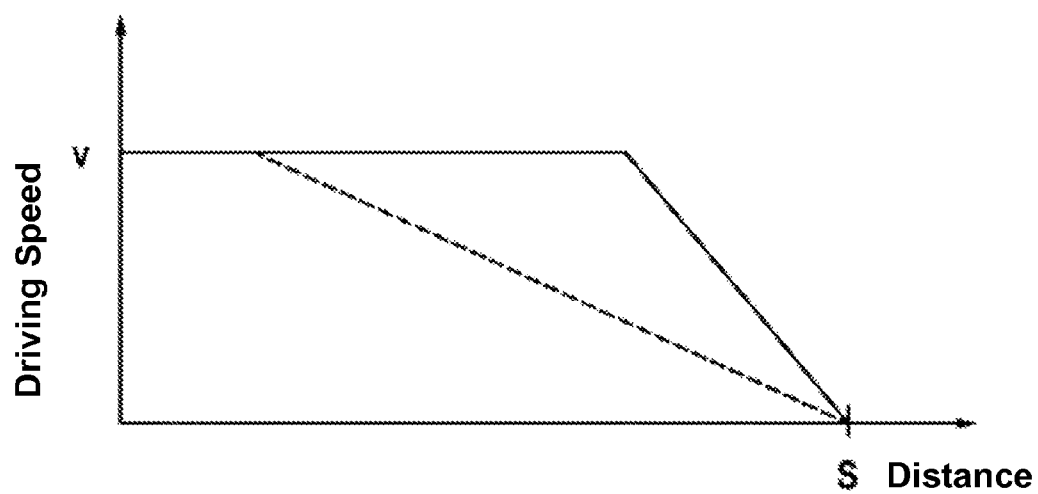
FIG. 2 shows a schematic view of a driving speed curve with a reduction of the driving speed, according to an example embodiment of the present invention.

For demonstration, FIG. 2 schematically shows the different driving speed profiles which result in the case of the above-described operating methods of the driver assistance system in the case of the different driving strategies, i.e., with and without the presence of a following vehicle. The curve of driving speed v is shown in simplified form over the distance, a position at which the vehicle is to stop being identified by S. The illustration is only schematic. For example, unlike that shown in FIG. 2, the deceleration procedure of the vehicle need not extend linearly in the speed-distance diagram in practice.

If a following vehicle is absent, proceeding from the initially existing speed, the driving speed curve shown by a dashed line results, in the case of which the driving speed decreases during the coasting. In comparison thereto, in the case of the driving speed curve with a following vehicle present, which is shown with a solid line, the existing speed is initially maintained up to a later point in time, and a driving speed reduction phase extends over a shorter stretch of road and accordingly over a shorter period of time. The driving speed reduction phase can be shortened by rolling in overrun mode, for example.

FIG. 2 illustrates that, if a following vehicle is absent, a driving strategy is determined, which provides a speed reduction phase which begins earlier and extends over a longer duration. During the speed reduction phase of the more fuel-saving driving strategy, a stretch of road is covered, on which this driving strategy is more fuel-saving than the driving strategy on the same stretch of road if a following vehicle is present. This is because in the latter case, the existing driving speed is initially maintained longer and therefore more fuel is consumed overall. It has also been shown upon comparison of the period of time of the speed reduction phase of the more fuel-saving driving strategy with the same period of time in the case of the presence of a following vehicle that, during this period of time, fuel is saved overall in the case of the driving strategy if a following vehicle is absent.

Control unit 10 optionally includes an evaluation unit 25, which is configured for the purpose of evaluating a detected following vehicle as relevant for the determination of the driving strategy based on its distance and/or its relative speed. For this purpose, control unit 10 can determine a distance, based on the relative speed, within which the following vehicle is relevant for the determination of the driving strategy. In contrast, the vehicles which have a sufficient distance, in consideration of their relative speed, are not relevant. The above-described selection of the driving strategy is carried out as a function of the detection of a vehicle which is evaluated as relevant, i.e., as a function of the presence of a vehicle within the certain distance.

Figure 3:
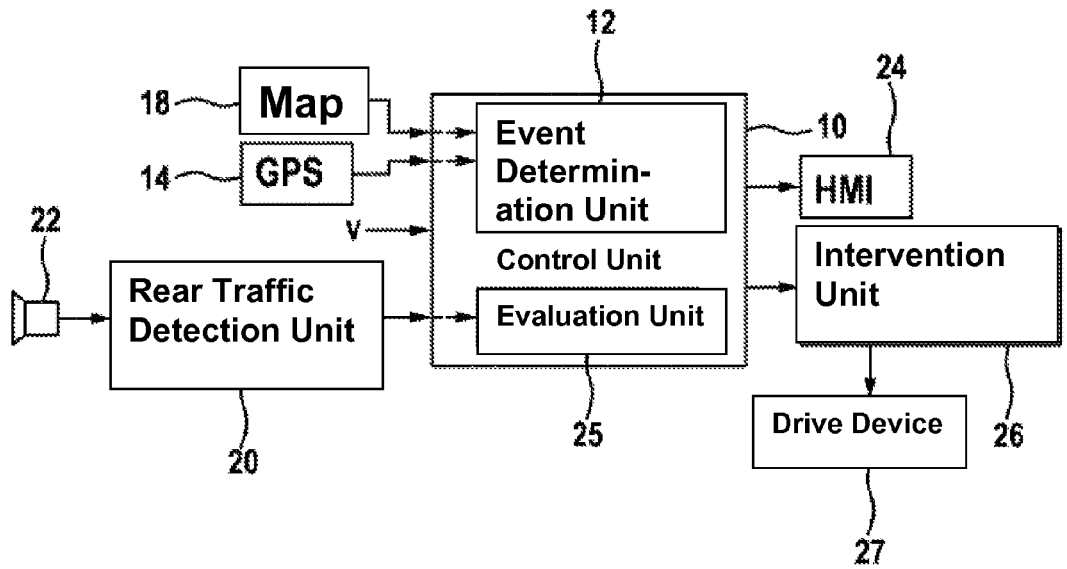
FIG. 3 shows a block diagram of a driver assistance system, in which an intervention into the longitudinal guiding of the vehicle can be carried out, according to another example embodiment of the present invention.

FIG. 3 shows a variant of the driver assistance system shown in FIG. 1, in which the system further includes an intervention unit 26 for intervening in the longitudinal guiding of the vehicle. Intervention unit 26 can be, for example, a vehicle longitudinal controller in the form of a driving speed controller, for example, a cruise control. Control unit 10 is connected to intervention unit 26, to automatically intervene in the longitudinal guiding of the vehicle based on the certain driving strategy, in particular by activating a drive device 27. Control unit 10 is configured for the purpose of intervening in the longitudinal guiding of the vehicle and autonomously initiating the coasting procedure upon reaching the starting point for the coasting procedure. The driver therefore does not need to become active to initiate the selection procedure, but rather only monitors the operation. At the end of the coasting procedure, the driver may independently brake the vehicle or bring it to a standstill, for example, if intervention unit 26 is not provided access to a braking system of the vehicle.

The driving speed curve of the driving strategy determined by control unit 10 again corresponds to the particular schematic view according to FIG. 2 in the two cases of the presence or absence of a following vehicle within the certain distance.

Figure 4:
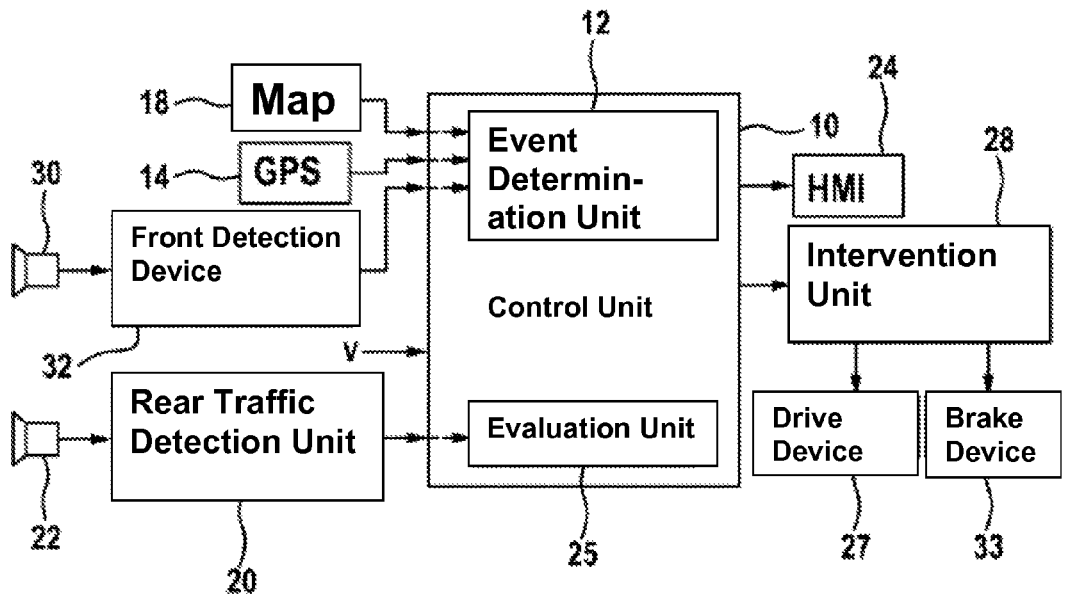
FIG. 4 shows a block diagram of a driver assistance system, in which deceleration and acceleration of the vehicle can be caused, according to another example embodiment of the present invention.

FIG. 4 shows a further variant of the driver assistance system of FIGS. 1 and 3. Instead of an intervention unit 26 in the form of a cruise control, an intervention unit 28 for intervening in the longitudinal guiding of the vehicle is provided in the form of an adaptive cruise control (ACC). Control unit 10 is connected for this purpose to a front sensor system, which includes a sensor 30 and a front detection device 32 for detecting a vehicle located ahead of the host vehicle, in particular a preceding vehicle in one's own lane. Such a front sensor system of a vehicle longitudinal controller is known per se. The vehicle movement may be fully automated in broad limits by front sensor system 30, 32 and intervention unit 28, and control unit 10 is configured for the purpose of taking into consideration a detection of a vehicle located in one's own lane ahead of the host vehicle in the determination of the driving condition specification.

Intervention unit 28 is configured to initiate an acceleration of the vehicle in particular and intervening in a brake device 33 to initiate mechanical braking.

As in the examples of FIGS. 1 and 3, control unit 10 is configured for the purpose, in the case in which the driving condition specification requires a reduction of the driving speed, if a relevant following vehicle is absent, of selecting a driving strategy which provides a speed reduction phase which begins earlier and extends over a longer duration than a driving strategy selected if a relevant following vehicle is present.

Furthermore, event determination unit 12 is configured in this example for the purpose of determining the driving condition specification based on information about a circumstance which will presumably permit a future increase of the driving speed, in particular in consideration of a setpoint speed. For example, the driving condition specification can include a target speed, which is increased in relation to the instantaneous driving speed and is less than or equal to a setpoint speed of the adaptive cruise control. For example, event determination unit 12 can be configured to determine a target speed, based on location information about the host vehicle and based on location information about a circumstance which permits a speed increase. An example of this is a change or cancellation of a speed limit. The instantaneous position of the host vehicle is detected with the aid of present position determination unit 14 and placed in relation to circumstances of this type recorded in digital map 18. In particular, the distance to corresponding events may be ascertained.

Control unit 10 is configured to, in the case in which (a) the driving condition specification requires an increase of the driving speed and (b) a relevant following vehicle is absent, determine a driving strategy which provides a speed increase phase extending over a longer duration than a strategy determined if a relevant following vehicle is present. Schematic vehicle speed curves are shown for these two cases as examples in FIG. 5.

Figure 5:
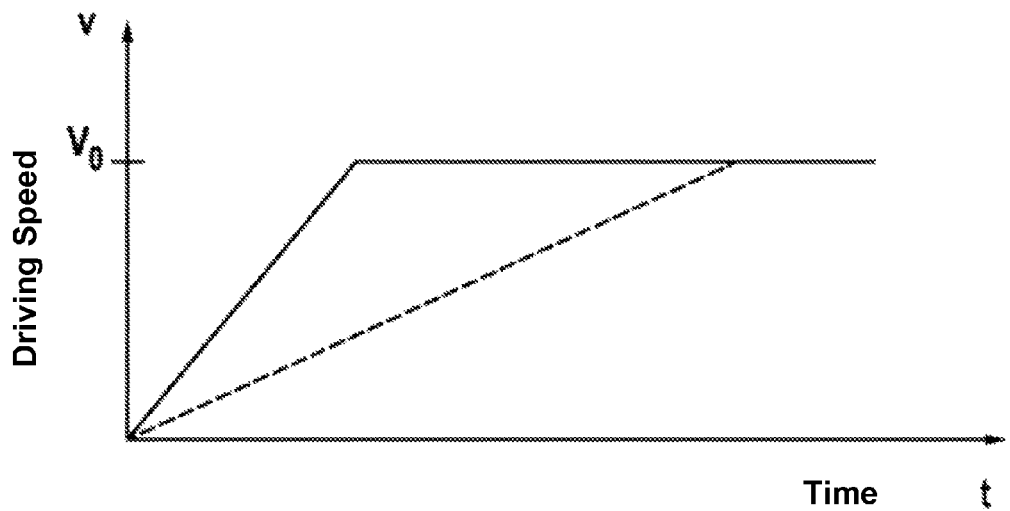
FIG. 5 shows a schematic view of a driving speed curve with an increase of the driving speed, according to an example embodiment of the present invention.

FIG. 5 shows, in simplified and schematic form, a curve shown by a dashed line of driving speed v over time t, which includes a speed increase phase to a target speed $V_o$ and corresponds to a moderate, fuel-saving acceleration. In comparison thereto, the driving speed curve shown with a solid line shows greater acceleration and earlier reaching of the target speed.

Therefore, while a slower acceleration occurs in the case of a free rear area behind the vehicle and therefore the fuel consumption and power demand are reduced, the acceleration is increased if a following vehicle is present and therefore an increase of the user acceptance and the safety are ensured.

In an example embodiment, control unit 10 is configured to induce the acceleration according to the determined driving strategy, for example, by specifying a drive torque or by specifying the certain driving speed curve via intervention unit 28. Signaling to the driver via optional driver interface 24 and/or an intervention in the longitudinal guiding may be carried out.

In the system according to FIG. 3, intervention unit 26 is also configured to initiate an acceleration of the vehicle, for example, an acceleration from a given speed to a setpoint speed of the cruise control. Control unit 10 may be configured here for the purpose, in the case in which the driving condition specification requires an increase of the driving speed, of executing a method for determining a driving strategy corresponding to FIG. 5, but proceeding from the given speed.

In the case in which the driving condition specification requires a reduction of the driving speed, the system with adaptive longitudinal vehicle control allows, in addition to causing coasting, further options of a driving strategy, in particular a fuel-saving driving strategy corresponding to FIG. 2. In particular, in an example embodiment, control unit 10 of FIG. 4 is configured for the purpose of autonomously decelerating the vehicle down to a standstill according to the determined driving strategy. Example driving strategies available for selection include coasting in overrun mode of the internal combustion engine, coasting in idle, coasting with deactivated internal combustion engine, coasting or deceleration with recuperation in the case of a hybrid vehicle, and/or mechanical braking.

Furthermore, control unit 10 in the examples of FIGS. 3 and 4 is configured to, in the absence of circumstances which require a change of the driving speed, determine a target instantaneous setpoint speed of the cruise control or the adaptive longitudinal vehicle control as a driving condition specification. In a case in which the driving condition specification requires maintaining the setpoint speed and a relevant following vehicle is absent, control unit 10 determines a driving strategy in which the driving speed varies in a greater range around the setpoint speed than in the case of a driving strategy determined if a relevant following vehicle is present. The driving strategy determined if a relevant vehicle is absent includes, for example, a phase of a gradual speed increase and, upon reaching an upper threshold $V_2$ for the speed, a phase of a gradual speed decrease and also, upon reaching a lower threshold $V_1$ for the speed, again a phase of a gradual speed increase to upper threshold $V_2$ for the speed. Such a method for speed control in an automatic driving speed operation and/or an automatic distance control operation of an adaptive longitudinal vehicle control is known, for example, from DE 10 2004 017 115 A1.

Figure 6:
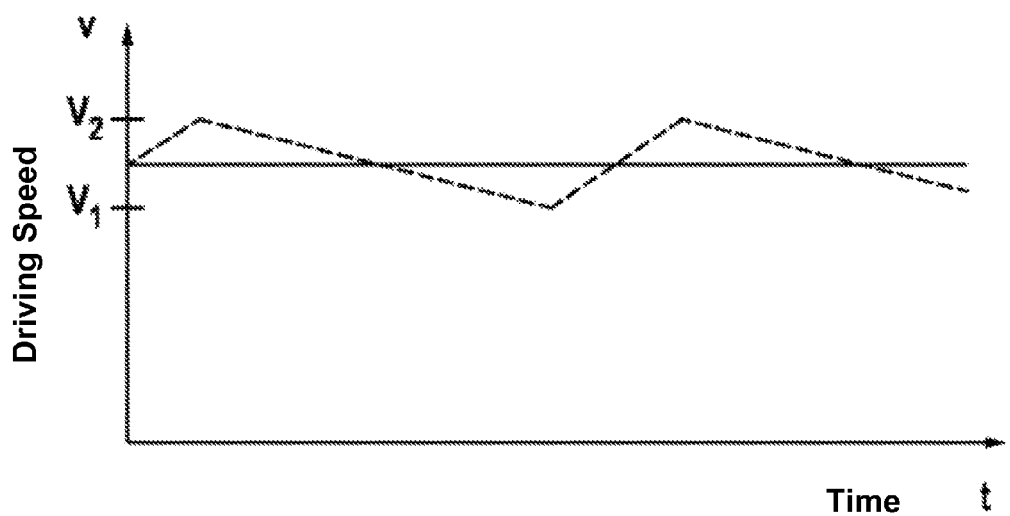
FIG. 6 shows a schematic view of a driving speed curve for maintaining a setpoint speed, according to an example embodiment of the present invention.

FIG. 6 schematically shows, using a dashed line, the corresponding driving speed curve, in which a speed increase phase and a speed reduction phase alternate. For comparison, a driving strategy for maintaining the setpoint speed with substantially less deviation from the setpoint speed is shown using a solid line, corresponding to a driving speed curve which is determined if a following vehicle is present.

During the periods of time of a particular speed reduction phase, and on the corresponding stretches of road, the driving strategy determined if a relevant vehicle is absent is more fuel-saving than the driving strategy if a relevant vehicle is present. The driving strategy selected if a relevant vehicle is absent is also more fuel-saving overall. For example, during a particular driving speed reduction phase, coasting of the vehicle until reaching the lower threshold may be carried out. The acceleration up to the upper threshold can be carried out in an economical speed range of an engine, for example.

Therefore, when driving at constant speed with a free rear area behind the vehicle, the speed can be varied in a greater range and therefore a preferably efficient manner of driving may be implemented.

Figure 7:
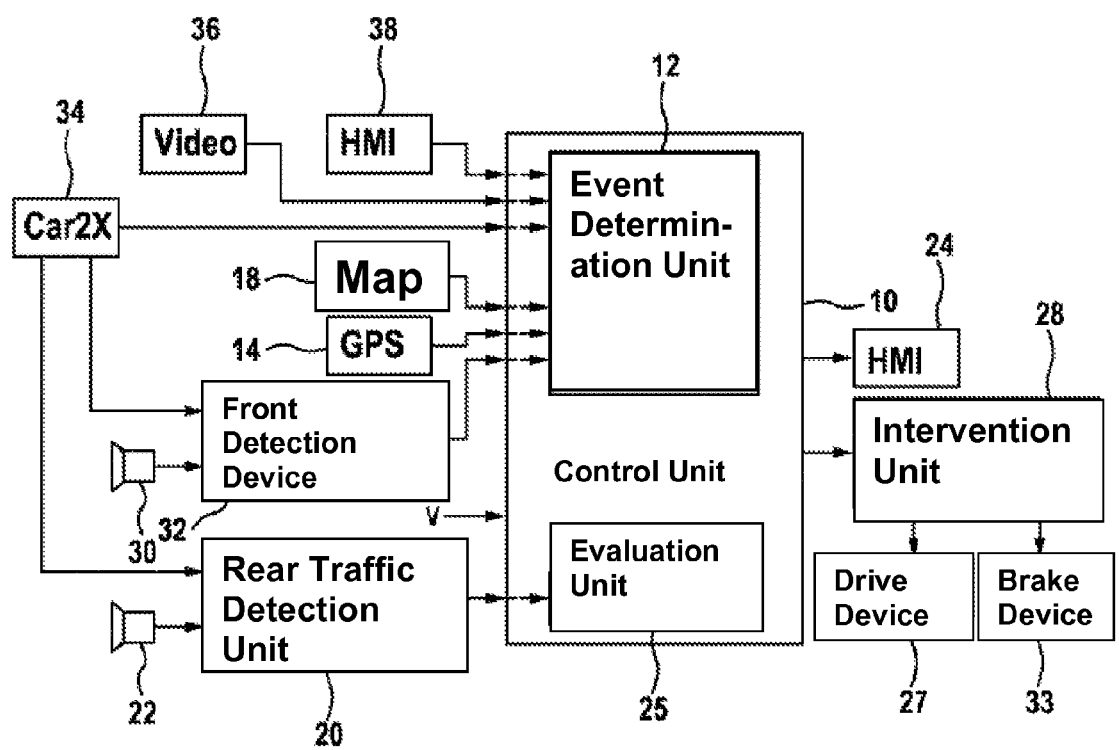
FIG. 7 shows a block diagram of a driver assistance system, according to another example embodiment of the present invention.

FIG. 7 shows a driver assistance system which is expanded relative to the system according to FIG. 4. The driver assistance system additionally includes a communication system 34, for example, a vehicle communication system for communication with a communication system outside the vehicle, for example, a Car2X communication system, in particular a Car2Car communication system. Communication system 34 is configured for receiving location information about a circumstance which will presumably require a future deceleration of the vehicle or a circumstance which will presumably permit a future increase of the driving speed. Such a circumstance can be, for example, a speed limit or the end thereof, for example, a beginning or an end of a speed-limit zone, a light-signal system, information about traffic light phases or switching phases of upcoming light-signal systems, or another road user, for example, a slower preceding vehicle. The location information and/or information about the circumstance can be received. The control unit 10, in particular its event determination unit 12, is configured for the purpose of determining a driving condition specification based on the received location information.

In an example embodiment, rear traffic detection unit 20 is configured to detect the presence of a following vehicle and optionally its distance and speed via communication interface 34. This interface is configured for receiving location information about other vehicles in the surroundings of the host vehicle. Communication interface 34 may also be provided alternatively to sensor 22 of rear traffic detection unit 20.

In an example embodiment, front detection device 32 is configured for detecting a vehicle located ahead of the host vehicle via communication interface 34, in particular a preceding vehicle in one's own lane. Communication interface 34 may also be provided alternatively to sensor 30 of front detection device 32.

In an example embodiment, an instantaneous state of a closest light-signal system or traffic light is also communicated, for example, via a suitable sensor system 36, for example, a video sensor system, or via a driver interface 38 (HMI) to the driver by control unit 10. The ascertained location information and the information received via driver interface 38 or via sensor system 36 can be taken into consideration in the determination of the driving strategy. Thus, for example, whether a light-signal system requires stopping (and therefore a corresponding reduction of the speed), or does not require the stopping (for example, during a green traffic light phase) can be taken into consideration in the determination of a target speed. It may be established via communication system 34, for example, whether the traffic is flowing in the area of the closest light-signal system and therefore no stopping is necessary.

In all of the described examples, the selection of a driving strategy can be carried out additionally as a function of information about the number and/or the occupation of the lanes, in particular the lanes in the travel direction. The ascertainment of such information is known per se for lane change assistants, for example. Thus, for example, rear traffic detection unit 20 and/or front detection device 32 can be configured for the purpose of supplying information about the number and/or the occupation of the lanes to control unit 10. In an example embodiment, the system is configured to perform the selection of the driving strategy further as a function of whether a passing option exists for a following vehicle, in particular a passing option on a lane in the travel direction. If a passing option exists, a more power-saving driving strategy may in turn be selected than otherwise.

While a motor vehicle including an internal combustion engine was presumed in the example embodiments, the method according to the present invention and the driver assistance system according to the present invention can also be used in vehicles that use another drive concept, for example, in a vehicle including a hybrid drive, a fuel-cell drive, and/or a solely electric drive, such as a battery vehicle.

Communication system 34 for the event determination and/or the detection of vehicles, sensor system 36, and/or driver interface 38 can also be provided in the other example embodiments.

What is claimed is:

1. A method for determining a driving strategy for a vehicle, comprising:
    obtaining, by at least one computer processor, a driving condition specification;
    detecting, by the at least one computer processor, whether a following vehicle is present, wherein the following vehicle is at least partially behind the vehicle; and
    selecting, by the at least one processor and from a plurality of candidate driving strategies, a driving strategy for achieving the specified driving condition based on (a) a power consumption analysis and (b) the detection;
    wherein:
    the plurality of candidate driving strategies includes a first driving strategy and a second driving strategy that is more power-saving than the first driving strategy;
    the at least one processor is configured to select the second strategy responsive to presence of a relevant following vehicle not being detected, and to select the first strategy responsive to detection of the presence of the relevant following vehicle.

2. The method of claim 1, wherein the specified driving condition includes a target speed.

3. The method of claim 1, wherein the presence of the following vehicle is detected and the selection is further based on at least one of a distance and a speed of the following vehicle.

4. The method of claim 1, wherein the plurality of candidate driving strategies includes at least two driving strategies that differ from each other with respect to at least one of a duration of a speed change phase and an absolute value of the speed change phase.

5. The method of claim 1, wherein:
the driving condition specification requires a change of the driving speed; and
the second strategy provides a speed change phase extending over a longer duration than the first strategy.

6. The method of claim 1, wherein:
the driving condition specification requires maintaining a setpoint speed; and
the second strategy provides a variation in driving speed in a greater range around the setpoint speed than the first strategy.

7. The method of claim 1, wherein information about the selected driving strategy is output via a driver interface of the vehicle.

8. The method of claim 1, further comprising:
automatically intervening in a longitudinal guiding of the vehicle based on the selected driving strategy.

9. A driver assistance system for a vehicle, comprising:
a rear traffic detection unit configured to detect whether a following vehicle is present, wherein the following vehicle is at least partially behind the vehicle; and
at least one processor configured to:
obtain a driving condition specification; and
based on (a) a power consumption analysis and (b) the detection, select for the vehicle and from a plurality of candidate longitudinal dynamics driving strategies that includes a first driving strategy and a second driving strategy that is more power-saving than the first driving strategy:
the first strategy where the detection is of the presence of the relevant following vehicle; and
the second strategy where presence of a relevant following vehicle is not detected.

10. The driver assistance system of claim 9, further comprising:
a communication system configured to receive information regarding a location associated with a circumstance which is presumed to one of (a) require a future deceleration of the vehicle and (b) permit a future acceleration of the vehicle, wherein the determination is further based on the received information.

11. The driver assistance system of claim 9, further comprising:
an intervention unit, wherein the at least one processor is connected to the intervention unit and is configured to cause the intervention unit to intervene in a longitudinal guiding of the vehicle based on the selected driving strategy.

* * * * *